Jan. 28, 1947.  O. W. HOSKING  2,415,063
BENDABLE VALVE STEM
Filed Feb. 25, 1941  2 Sheets-Sheet 1
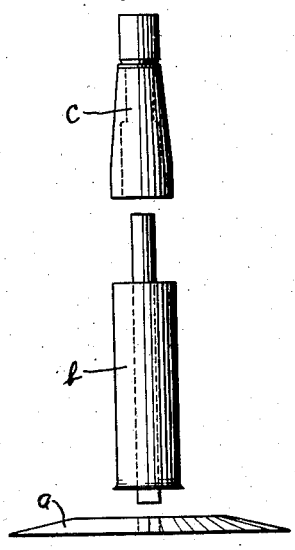
Fig.2
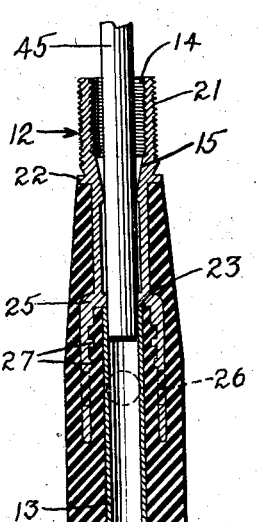
Fig.1
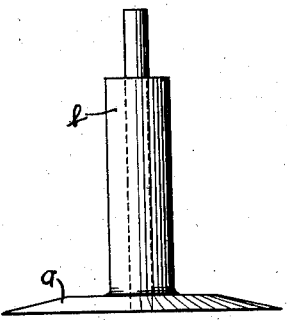
Fig.4
Fig.3
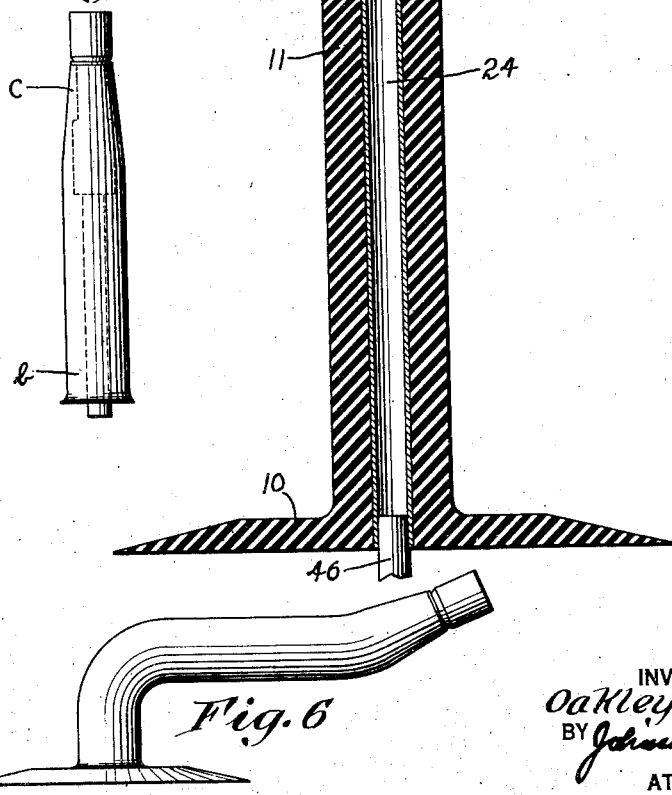
Fig.6
INVENTOR
Oakley W. Hosking
BY Johnson, Kline & Smyth
ATTORNEYS

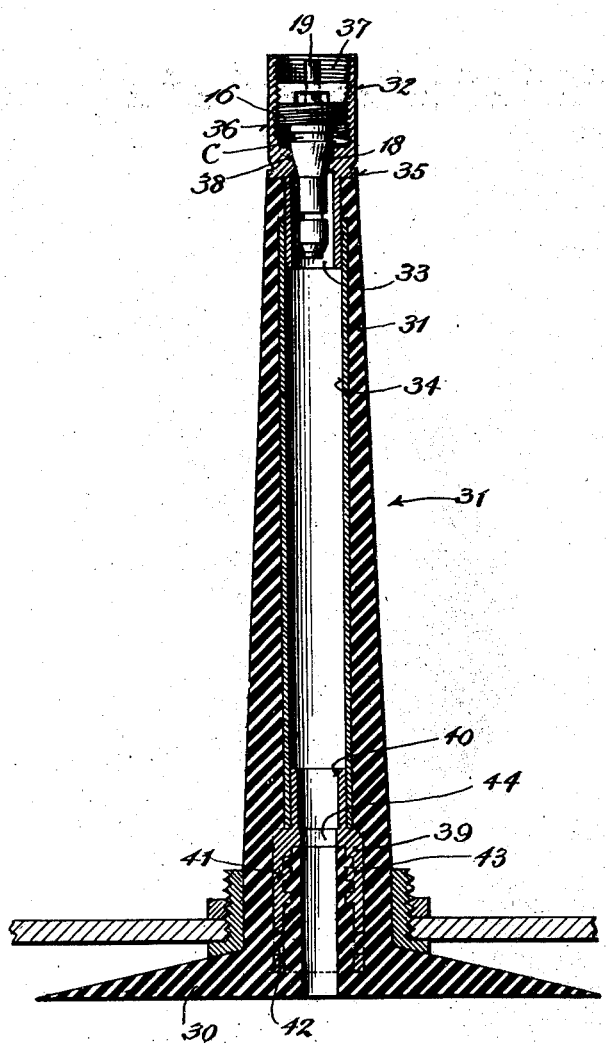

Patented Jan. 28, 1947

2,415,063

UNITED STATES PATENT OFFICE 2,415,063

BENDABLE VALVE STEM

Oakley W. Hosking, Monroe, N. Y., assignor to Composite Rubber Products Corporation, Bridgeport, Conn., a corporation of Connecticut Application February 25, 1941, Serial No. 380,481

12 Claims. (Cl. 152—430)

The present invention relates to hand-bendable rubber valve stems for use with inflatable air containers, especially the inner tubes of motor vehicle tires and to a method for their manufacture.

Motor vehicle tires generally comprise an air bag or inner tube having a valve stem attached thereto. When mounted upon a wheel frame or rim, the valve stem protrudes toward the axis of the wheel, generally through an aperture in the rim. In smaller vehicles such as passenger automobiles, relatively short valve stems of more or less rigid construction are used, the disposition of the stem on the wheel permitting ready access thereto for installation and replacement of the valve core, and for inflating and deflating the tire.

However, in wheels used on larger vehicles, such as trucks or buses, the valve stems of the tires are often exceedingly difficult of access, especially when a pair or plurality of tires are mounted side by side on the same wheel. It is desirable under these circumstances, to provide, especially on the inwardly disposed tires, a relatively long valve stem which can be bent outward at an angle so that its tip is readily accessible from the outside of the wheel.

It has been proposed heretofore to provide hand-bendable valve stems having exposed metal bendable portions for overcoming the aforesaid difficulty, but the fact that the relatively soft metal tubing of the stem is exposed and unprotected often results in accidental damage thereto during use.

It has also been proposed to provide resiliently bendable rubber valve stems which resume their original shape when released after bending, but the necessity of holding such stems in bent position for valve installation or tire inflation is exceedingly inconvenient.

Accordingly, it is an object of the present invention to provide a rubber and metal valve stem of the hand-bendable type, wherein the rubber forms a protective layer for the bendable metal portions of the stem and the stem is adapted to retain any desired shape which it is given by bending.

It is also an object to provide a stem of the aforesaid type, wherein the metal portions are firmly anchored in the rubber, even without adherence of the rubber to the metal, and wherein the contacting rubber and metal surfaces are so shaped as to prevent the seepage of air between them from the bore of the stem to its exterior.

Still another object is to provide a bendable valve stem of the said type of relatively simple and economical, but rugged constructiton, as well as to provide a convenient and economical method for manufacturing the valve stems.

A further object is to provide improved means for mounting the stem when installed on the rim of a wheel so that the portion attached to the air bag is rigidly held during the bending of the remainder of the stem.

Further objects and advantages of the invention will appear from the following description referring to the accompanying drawings, which illustrate several embodiments thereof and in which:

Figure 1 is a central vertical cross-section of a bendable valve stem according to the present invention, including a pair of pilot pins of a mold shown in the relative positions which they occupy during the molding process.

Fig. 2 is an exploded view of separate portions of the valve stem, adapted to be assembled for the production of the finished article.

Fig. 3 represents an intermediate stage in the manufacture of the valve stem of Fig. 1.

Fig. 4 illustrates an alternate intermediate stage in the manufacture of the valve stem of Fig. 1.

Fig. 5 is a central vertical cross-section of a modification of the hand-bendable valve stem of the present invention.

Fig. 6 is a side elevational view of the finished valve stem according to the present invention illustrating the manner in which it is adapted to be used.

According to the present invention, the valve stem comprises a rubber base flange for securing the stem to an air container and an integral rubber stem portion, having a rigid metal valve core-receiving insert embedded therein at its upper end. An elongated bendable metal tube extends inward from said metal insert for the major portion of the length of said rubber stem, said metal insert and bendable tube having coaligned bores which form a passage through the stem. In order to retain the metal insert in the tube against the tendency of air pressure in the container to blow out the metal portions of the stem, means is provided for anchoring the metal portion to the structure by interengagement with the rubber portion thereof. In order to prevent escape of air between contiguous surfaces of the rubber and metal parts, the latter are so shaped that air tending to escape between said contacting surfaces must flow along a tortuous path in order to attain the exterior of the stem. If a part of the bore through the stem is surrounded by rubber, this portion of the rubber is preferably adapted to be forced by internal air pressure against adjacent metal parts of the stem affording an automatic sealing effect against the escape of air. Ballooning of the rubber portion of the stem is prevented by virtue of the fact that the passage through the stem lies substantially for its entire length within the metal parts of the stem.

The valve stem as illustrated in Fig. 1, comprises a rubber flange or base portion 10 and a rubber stem portion 11, integral therewith. A rigid metal valve core-receiving insert 12 having a bore therethrough is embedded in the tip of the stem portion 11 and abuts a bendable metal tube 13 which extends to the lower surface of the base portion 10.

On its interior, the metal insert comprises means for receiving and retaining therein a valve insides or core, such means comprising, for instance, a threaded portion 14 adjacent the tip and a conically shaped seat 15 inwardly of the threaded portion. This interior construction is adapted to receive and retain a conventional valve core of the type shown at C, in Fig. 5, comprising an externally threaded nut 16 for cooperation with threads 14, a barrel 17 having a conically shaped portion 18 which seats against the conical seat 15, and a valve pin 19 extending through a central passage in the barrel and nut and carrying a valve closure 20 at its lower end for closing the said passage against the influx of air.

If desired, insert 12 may be threaded externally adjacent its tip as indicated at 21, the threaded portion lying beyond the tip of the rubber stem portion 11, to provide means for securing a cap or other threaded member to the tip of the insert. The said insert preferably includes an external shoulder 22 which abuts the tip of the rubber stem portion 11.

The metal insert 12 is provided with an inwardly faced abutment 23, spaced inwardly from the conical seat 15, which contacts the upper end of the bendable metal tube 13, and is provided with an aperture of the same diameter as the interior bore 24 of the bendable metal tube 13, said diameter being not greater and preferably the same size as the minimum diameter of the conical seat 15. A skirt 25 extends inward from the abutment 23, surrounding the upper end of the bendable tube 13 in spaced relation therewith and embedded in the rubber of the stem portion 11.

The skirt 25 is preferably provided with a number of apertures 26 through which the rubber of the stem portion extends, thereby anchoring the metal insert 12 in the rubber against blowing out of the stem under the force of internal air pressure. Since the upper end of tube 13 abuts the anchored metal insert, the latter also retains the tube in the rubber stem.

The interior surface of the skirt 25 is preferably formed with a series of annular ribs 27 between which the rubber of the stem portion 11 extends, thereby forming a tortuous path from the junction of tube 13 and abutment 23 to the exterior of the stem at the junction of the tip of the rubber stem portion 11 with the shoulder 22, effectively preventing escape of air from the interior of the valve stem between the contacting surfaces of the metal insert and the embedding rubber, and also serving in part to anchor the insert in the rubber. It will thus be observed that the stem is reenforced for its entire length by metal, thus avoiding any tendency of the compressed air in the bore of the stem to balloon the rubber portions thereof.

The slender, thin-walled metal tube 13 is made of pliable metal, such as brass, copper, aluminum, or the like, and is adapted to be easily bent into any desired shape by hand and is substantially nonresilient, that is, it is adapted to retain its shape after bending. As a result, when the inner tube of a tire having a valve stem of the described type is installed on a wheel of such construction or disposition on a vehicle that an ordinary straight valve stem would be inaccessible for installation or replacement of a valve core or for attaching a hose to inflate the tire, the stem may be bent outward at right angles as indicated in Fig. 6 or in any other convenient shape, to render the valve mechanism completely accessible for repair or inflation of the tire.

A modification of the bendable valve stem according to the present invention is shown in Fig. 5. In this case, the bendable metal tube extending for the major portion of the length of the stem is interposed between the valve core-receiving insert at the tip of the stem and a rigid means for anchoring the metal portions of the structure in the rubber portions thereof, said anchoring means being disposed near the base of the stem and the ends of the bendable tube being secured to said means and to the insert to render the anchoring means effective for all of the metal portions of the structure.

The stem of Fig. 5 comprises a rubber base flange 30 and a stem portion 31. A rigid metal valve core-receiving insert 32 similar in construction to the upper portion of corresponding insert 12 is disposed at the tip of the stem portion 31 and comprises a cylindrical inner sleeve portion 33 extending inward from the tip of the rubber stem 31 and telescopically engaging a bendable metal tube 34. The joint between the said metal tube and insert is rendered secure and airtight, for instance, by soldering.

The sleeve portion 33 preferably terminates at its upper end in an external annular shoulder 35 similar to shoulder 22, abutting the tip of the rubber stem portion 31. The protruding portion 36 of the insert may be externally threaded if desired in the same manner as insert 12.

Internally, insert 32 comprises a threaded portion 37 adjacent its tip for engaging the threaded nut 16 of the valve core C described above, and a conical seat 38 inwardly of threads 37 for receiving the conical portion 18 of said core.

A bendable metal tube 34 having the same properties and character as tube 13 extends inward through the rubber stem 31 and is surrounded by the rubber thereof at its lower end and is secured to an anchoring means 39, comprising a collar 40 telescopically engaging the lower end of tube 34 and fastened thereto for instance, by soldering. The anchoring means further comprises a skirt 41, integral with said collar and similar to skirt 25.

The said skirt is preferably provided with a number of lateral apertures 42 and a plurality of internal annular ribs 43, while at its upper end adjacent collar 40, an aperture 44 is formed concentric with the collar 40.

The skirt 39 extends inward almost to the lower surface of the rubber base flange 30 and is surrounded both internally and externally by the rubber of the stem. Engagement of the rubber with apertures 42 and ribs 43 serves the same purpose as engagement of the corresponding portions of the skirt 25, anchoring the metal parts of the valve stem in the rubber and forming a tortuous path along adjoining surfaces of metal and rubber from the interior of the stem to its exterior.

As in the case of the valve stem of Fig. 1, the stem of Fig. 5 is reenforced substantially for its entire length with metal, thus avoiding any tendency to cause ballooning of the rubber portions thereof.

In the process of molding the rubber valve stems of the present invention in a single operation or of assembling premolded portions thereof comprises providing the mold as provided with central pilot pins 45 and 46 (Fig. 1) at its upper and lower ends, one or both of which serve not only to center the metal parts, but also to prevent entrance of the rubber into the bore of the stem.

Variations of the method of forming the valve stem of Fig. 1 are illustrated in Figs. 2, 3, and 4. As indicated in Fig. 2, the valve stem may be preformed at separate sections, lower section *a* being the base flange, mid-section *b* comprising the bendable metal tube 13 and the rubber which surrounds it below the limit of skirt 25, and finally, upper section *c* comprising insert 12 together with the rubber in which it is embedded.

If desired, all three sections may be preformed and partly cured. The separate sections are then assembled in a mold, such as that used for the one-step process described with reference to Fig. 1. After closing the mold, the vulcanization is completed by suitable application of heat and pressure, the rubber sections being simultaneously bonded together.

The valve stem of Fig. 5 may be formed to be vulcanized in a mold or die similar to that used for the valve stem of Fig. 1.

Variations and modifications may be made within the scope of this invention and portions of the improvements may be used without others.

I claim:

1. A bendable rubber valve stem having a bore therethrough extending from base to tip, and comprising a rubber body portion; a rigid valve core-receiving insert circumferentially surrounded by rubber at the tip of said body portion; a slender, thin-walled, substantially nonresiliently bendable metal tube surrounded by the rubber of said body portion and extending inward from said rigid insert for the major continuous portion of the length of said body portion, said tube being readily bendable by hand, and maintained in bent position by said tube, said insert and said tube having coaligned bores forming at least a part of the bore of the valve stem; and means for anchoring said metal tube and insert against ejection from the tip of the rubber body portion by air under pressure within the bore of the valve stem.

2. A bendable rubber valve stem having a bore therethrough extending from base to tip, and comprising a rubber body portion; a rigid valve core-receiving insert circumferentially surrounded by rubber at the tip of said body portion; a slender, thin-walled, substantially nonresiliently bendable metal tube surrounded by the rubber of said body portion and extending inward from said rigid insert for the major continuous portion of the length of said body portion, said tube being readily bendable by hand, and maintained in bent position by said tube, said insert and said tube having coaligned bores forming at least a part of the bore of the valve stem; and means for retaining said metal tube and insert against ejection from the tip of said rubber body portion by air under pressure within the bore of the valve stem, said means comprising a portion of said rigid insert, embedded in the rubber of the body portion, and having interlocking engagement therewith.

3. A bendable rubber valve stem having a bore therethrough extending from base to tip, and comprising a rubber body portion; a rigid valve core-receiving insert circumferentially surrounded by rubber at the tip of said body portion; a manually bendable metal tube surrounded by the rubber of said body portion extending inward from said rigid insert for the major continuous portion of the length of said body portion, said insert and said tube having coaligned bores forming at least a part of the bore of the valve stem; and means for retaining said metal tube and insert against ejection from the tip of the rubber body portion by air under pressure within the bore of the stem and for preventing the escape of said compressed air, said means comprising a rigid skirt integrally joined to said insert, extending toward the base of the stem and surrounding said metal tube in spaced relation therewith, the rubber of the body portion lying both internally and externally of said skirt, the junction of the interior surface of the skirt and the rubber lying within said skirt being accessible to air under pressure in the bore of said stem, said skirt having on its interior surface a series of grooves transverse to the axis of the stem into which the rubber extends forming a tortuous path from the bore of the stem to its exterior between contacting metal and rubber surfaces.

4. A bendable rubber valve stem having a bore therethrough extending from base to tip, comprising a rubber body portion; a rigid valve core-receiving insert circumferentially surrounded by rubber at the tip of said body portion; a slender, thin-walled, substantially nonresiliently bendable metal tube surrounded by the rubber of said body portion having one end abutting said insert and extending inwardly therefrom for the major continuous portion of the length of said rubber body portion, said tube being readily bendable by hand, and maintained in bent position by said tube, said insert and tube having coaligned portions forming at least a part of the bore of the stem; and anchoring means on said insert for retaining said insert and said tube in said stem against ejection from the tip of the stem by air under pressure within the bore of the stem; the surrounding rubber of the body portion constituting the sole means for maintaining said tube in abutting relation with said insert.

5. A bendable rubber valve stem having a bore therethrough extending from base to tip comprising a rubber body portion; a rigid valve core-receiving insert circumferentially surrounded by rubber at the tip of said body portion; a slender, thin-walled, substantially nonresiliently bendable metal tube surrounded by the rubber of said body portion having one end engaging said insert solely in abutting relation, and extending inwardly therefrom for the major continuous portion of the length of said rubber body portion, said tube being readily bendable by hand, and maintained in bent position by said tube, said insert and tube having coaligned portions forming at least a part of the bore of the stem; and anchoring means for retaining said insert and said tube in said stem against ejection by air under pressure within the bore of the stem comprising a rigid skirt portion integral with said insert, embedded in the rubber of said body portion and surrounding the abutting end of said metal tube in spaced relation therewith, the rubber lying both internally and exteriorly of said skirt portion, the internally lying rubber maintaining said alignment of the tube and insert, and said skirt having interlocking engagement with the rubber of the stem.

6. A bendable rubber valve stem having a bore therethrough extending from base to tip comprising a rubber body portion; a rigid valve core-receiving insert circumferentially surrounded by rubber at the tip of said body portion; a manually bendable metal tube, nonintegral with said insert, surrounded by the rubber of said body portion having one end abutting said insert and extending inwardly therefrom for the major continuous portion of the length of said rubber body portion, said insert and tube having coaligned portions including the abutting parts thereof forming at least a part of the bore of the stem; and anchoring means for retaining said insert and said tube in said stem against ejection by air under pressure within the bore of the stem comprising a rigid skirt portion integral with said insert embedded in the rubber of said body portion and surrounding the abutting end of said metal tube in spaced relation therewith, the rubber lying both internally and exteriorly of said skirt portion, said skirt portion having on its interior surface a series of ribs transverse to the axis of the stem between which the rubber of the body portion extends, to provide a tortuous path from the bore of the stem, between the abutting ends of said insert and said metal tube, and along the contacting surfaces of said rigid insert and the surrounding rubber to the exterior of the stem, whereby escape of air under pressure within the bore, along said path, is substantially prevented.

7. A bendable rubber valve stem having a bore therethrough extending from base to tip comprising a rubber body portion; a rigid valve core-receiving insert circumferentially surrounded by rubber at the tip of said body portion; a manually bendable metal tube surrounded by the rubber of said body portion having one end abutting said insert and extending inwardly therefrom for the major continuous portion of the length of said rubber body portion, said insert and tube having coaligned portions forming at least a part of the bore of the stem; and anchoring means on said insert for retaining said insert and said tube in said stem against ejection from the tip of the stem by air under pressure within the bore of the stem, the bore of said tube and the bore of said insert adjacent the abutting portions thereof having the same diameter which is equal to the minimum inside diameter of said insert.

8. A bendable rubber valve stem having a bore therethrough extending from base to tip comprising a rubber body portion; a rigid valve core-receiving insert extending into the tip of the rubber body portion; a slender, thin-walled, substantially nonresiliently bendable metal tube extending inward from said metal insert for the major continuous portion of the length of said rubber body and secured to said insert in air-tight relation, said tube being readily bendable by hand, and maintained in bent position by said tube, said insert and tube being circumferentially surrounded by the rubber of the body portion and having coaligned bores forming at least a part of the bore of the stem; and means having interengagement with the rubber secured to the lower end of said tube for retaining the tube and insert against ejection from the tip of said body portion by air under pressure within the bore of said stem.

9. A bendable rubber valve stem having a bore therethrough extending from base to tip comprising a rubber body portion; a rigid valve core-receiving insert extending into the tip of the rubber body portion; a slender, thin-walled, substantially nonresiliently bendable metal tube extending inward from said metal insert for the major continuous portion of the length of said rubber body and secured to said insert in air-tight relation, said tube being readily bendable by hand, and maintained in bent position by said tube, said insert and tube being circumferentially surrounded by the rubber of the body portion and having coaligned bores forming at least a part of the bore of the stem; and means having interengagement with the rubber secured to the lower end of said tube for retaining the tube and insert against ejection from the tip of said stem by air under pressure within the bore of the stem, said means comprising a rigid skirt secured to the lower end of said tube extending toward the base of the stem and terminating adjacent the lower surface of the rubber body portion the rubber of the latter lying both internally and exteriorly of said skirt, said skirt having transverse ribs on its inner surface engaging the interiorly lying rubber and providing a tortuous path, between the contiguous surfaces of the rubber and the other aforesaid stem portions, from the interior of the bore of the stem to its exterior.

10. In combination with a hand-bendable rubber valve stem comprising a metal valve-receiving insert embedded in the tip of a rubber body portion and a bendable metal tube extending inward from said insert for a major continuous portion of the length of said rubber body, the rubber portions of the stem being reenforced by the metal parts thereof for substantially its entire length, means for mounting said stem to protrude through an aperture in the frame of an air container to which the stem is attached, comprising a rigid collar secured in said aperture and extending outwardly therefrom, said collar circumferentially fitting the exterior surface of the rubber body portion adjacent its base to retain the base of the stem against substantial angular displacement during bending of the bendable portion of the stem.

11. In combination with a hand bendable rubber valve stem comprising a metal valve-receiving insert embedded in the tip of a rubber body portion and a bendable metal tube extending inward from said insert for a major continuous portion of the length of said rubber body, the rubber portions of the stem being reenforced by the metal parts thereof for substantially its entire length, means for mounting said stem to protrude through an aperture in the frame of an air container to which the stem is attached, comprising a bushing secured in said aperture and extending outwardly therefrom, said bushing circumferentially fitting the exterior surface of the rubber body portion adjacent the base of the stem to retain the base of the stem against substantial angular displacement during bending of the bendable portion thereof and means for securing the bushing in said aperture comprising a flange on the inner end of the bushing engaging the inner wall of the frame and a lock nut threaded to external threads on the bushing for engaging the outer surface of the frame at the edges of said aperture.

12. A rubber valve stem having a bore extending therethrough from base to tip, and comprising a rubber body portion; a relatively rigid valve core-receiving insert embedded in the rubber at the tip of the stem, and circumferentially surrounded thereby; a separate bendable tubular member having one end abutting said insert, surrounded by the rubber of the body portion, and extending from the insert toward the base of the stem, said insert and tubular member having coaligned bores forming at least a portion of the bore of the stem; and anchoring means on said insert for retaining the insert and tubular member against ejection from the tip of the stem by air under pressure within the bore thereof, the surrounding rubber of the body portion sealing the junction of said insert and tubular member against escape of air from the bore and constituting the sole means for maintaining said insert and tubular member in abutting and coaligned relation.

OAKLEY W. HOSKING.